United States Patent [19]

Kumagai et al.

[11] 4,388,009
[45] Jun. 14, 1983

[54] COOLING SYSTEM FOR A LINE PRINTER

[75] Inventors: Ikuo Kumagai; Yukiaki Koyanagi; Hiroshi Hidaka, all of Tokyo, Japan

[73] Assignee: Nippon Electric Company, Limited, Tokyo, Japan

[21] Appl. No.: 154,666

[22] Filed: May 30, 1980

[30] Foreign Application Priority Data

Jun. 1, 1979 [JP] Japan .................................. 54-69085
Jun. 1, 1979 [JP] Japan .................................. 54-69086
Jun. 1, 1979 [JP] Japan ............................... 54-74955[U]
Jun. 1, 1979 [JP] Japan ............................... 54-74960[U]

[51] Int. Cl.³ ............................................ B41J 29/00
[52] U.S. Cl. ................................................. 400/679
[58] Field of Search .................... 400/124, 687–690.4, 400/679; 101/111

[56] References Cited

U.S. PATENT DOCUMENTS

| 1,604,639 | 10/1926 | Corcoran et al. | 400/690.3 |
| 3,308,919 | 3/1967 | Cunningham | 400/690 |
| 3,476,210 | 11/1969 | Carlson | 400/690 |
| 3,779,545 | 12/1973 | Schuhmann et al. | 271/204 |
| 3,845,711 | 11/1974 | Helms | 101/111 |
| 4,033,255 | 7/1977 | Kleist et al. | 400/124 |
| 4,044,668 | 8/1977 | Barros et al. | 400/124 |

Primary Examiner—Richard J. Apley
Assistant Examiner—David J. Isabella
Attorney, Agent, or Firm—Sughrue, Mion, Zinn, Macpeak and Seas

[57] ABSTRACT

A line printer is provided with at least one cross flow fan positioned above the hammer actuators for directing an air flow across the actuators for cooling the same. The exiting heated air is ventilated to the outside and may pass through sound absorbers or mufflers in order to achieve quiet operation.

5 Claims, 10 Drawing Figures

COOLING SYSTEM FOR A LINE PRINTER

This invention relates generally to high speed impact printers and more particularly to an improved cooling system for use in a high speed line printer.

A high speed line printer, as disclosed in the U.S. Pat. No. 3,845,711 entitled "BELT PRINTER", comprises a flexible band assembly for moving type characters along a row of individually actuatable hammers. The band is supported on pulleys and carries on its outside surface a plurality of parallel elongated slugs extending across the width of the band. Each slug has a type character formed on its end face which can be impacted by an actuated hammer as it moves therepast. When the hammers are actuated by respective hammer-actuators, the actuators are heated.

In order to cool the heated actuators, a sirocco fan is provided below the actuators to achieve a forced cooling by blowing up through the actuators. However, a large space is required for the installation of such a sirocco fan to achieve a sufficient cooling effect, with the result that the line printer becomes tall, and it is impossible to construct a table type line printer.

It is, therefore, an object of this invention to provide an improved line printer with a simplified cooling system for cooling hammer actuators.

SUMMARY OF THE INVENTION

According to this invention, there is provided an improved line printer comprising: a plurality of type characters; a plurality of individually actuatable hammers, said type characters being impacted by said hammers; a plurality of hammer actuators for individually actuating said hammers; and means provided above said hammer actuators and for air-cooling said hammer actuators.

BRIEF DESCRIPTION OF THE DRAWINGS

The features and advantages of this invention will be better understood from the following detailed description of preferred embodiments of this invention taken in conjunction with the accompanying drawings, wherein.

DETAILED DESCRIPTION OF THE PREFERRED EMBODIMENTS

Figure 1:
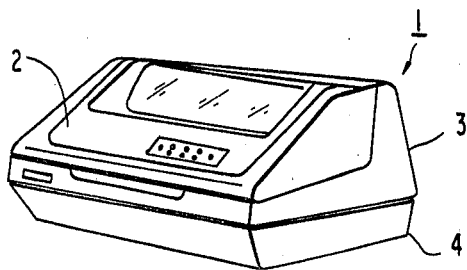
FIG. 1 is a perspective view of a first embodiment of this invention.

Referring to FIG. 1, a line printer 1 according to the first embodiment of this invention comprises a top cover 2, middle covers 3, and a base cover 4.

Figure 2:
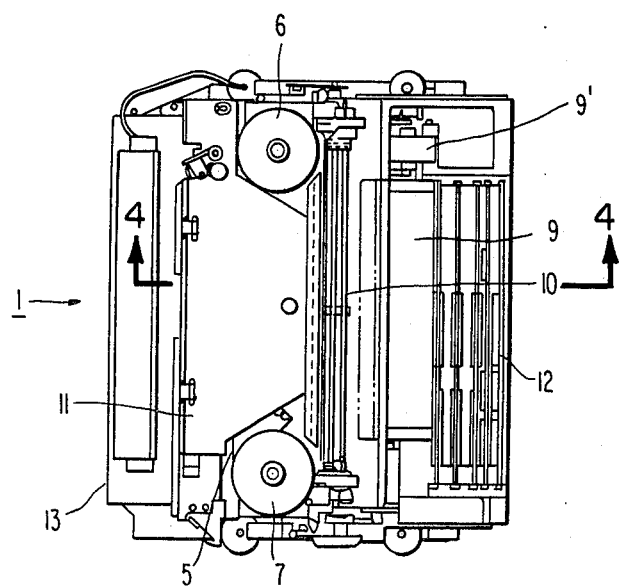
FIG. 2 is a plan view of the first embodiment shown in FIG. 1.
Figure 3:
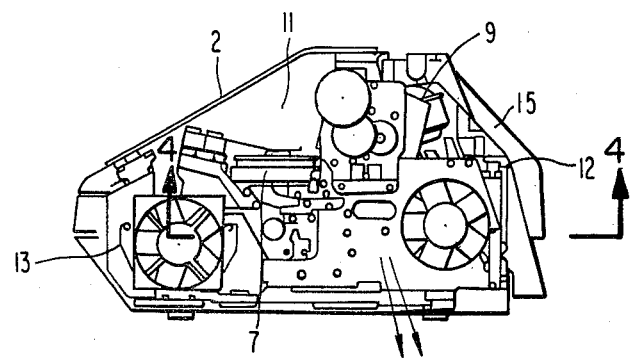
FIG. 3 is a side view of the first embodiment shown in FIG. 1.
Figure 4:
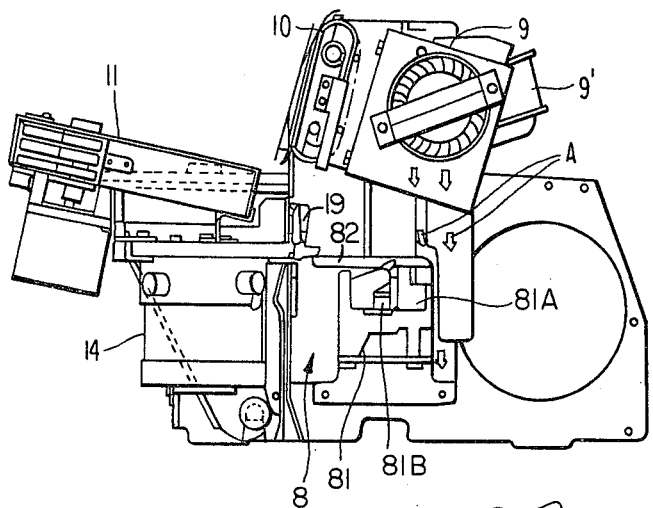
FIG. 4 is a partial sectional view taken along lines 4—4 of FIGS. 2 and 3.

Referring to FIGS. 2, 3 and 4, the line printer 1 comprises a driving pulley 6 driven by a motor 14, a freely rotative pulley 7, and a flexible character-band 5 supported on the pulleys 6 and 7. The band 5 carries on its outside surface a plurality of parallel elongated slugs each having a type character. As shown in FIG. 4, a plurality of print hammers 19 and hammer actuator assemblies 8, each including an actuator 81 and an actuator lever 82, are provided behind and along the type-character band 5. A cross flow fan 9 is provided above the hammer actuator assemblies 8 for cooling the heated hammer actuators 8. The cross flow fan 9 is driven by a motor 9'.

The line printer 1 further comprises a paper feeding mechanism including tractor chains 10 for pulling edge perforated paper past the impact faces of the hammers 19. An inked ribbon cassette 11 for housing an inked ribbon is provided above the type-character band 5. The inked ribbon is pulled out from one opening of the cassette 11 and passed between the type-character band 5 and the hammers 19 and then entered into the other opening of the cassette 11. A control unit 12 is provided behind the hammer actuator assemblies 8 for controlling the operation of the line printer 1. An electric source unit 13 is provided below the type-character band 5 and the cassette 11.

As shown in FIG. 4, each of the hammer actuators 81 comprises an armature including, a core 81A and a coil 81B and core and coil, i.e., the actuator 81 is heated when electric current is applied to coil 81B. The heated actuators 81 are cooled by the air flow indicated by arrows A from the cross flow fan 9.

Figure 5:
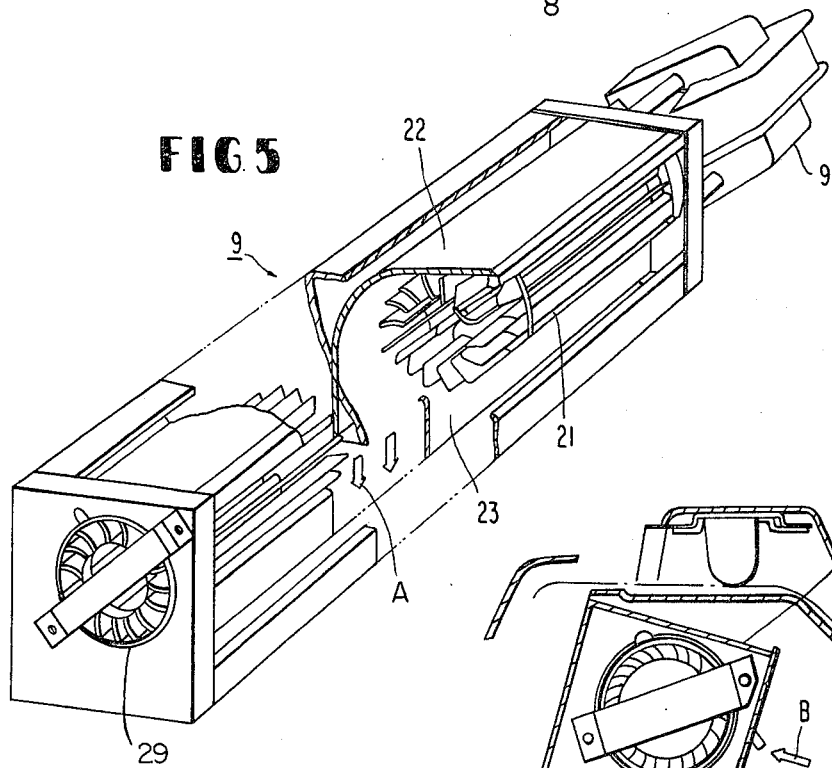
FIG. 5 is a perspective view of a cross flow fan used in the first embodiment shown in FIG. 1.

As shown in FIG. 5, the cross flow fan 9 comprises a plurality of fan wheels 21, walls 22 and 23 and is driven by the motor 9'. When the cross flow fan 9 rotates, the cooling air is drawn from the side opening and blown down from the gap between the walls 22 and 23 in a direction A depicted by arrows. The blown down air is directed as shown in FIG. 4 to the heated actuators 81 to make a heated air flow. The heated air exits from the lower opening provided at the bottom of the line printer 1 as shown in FIG. 3 (illustrated at 16 in FIG. 8).

Figure 6:
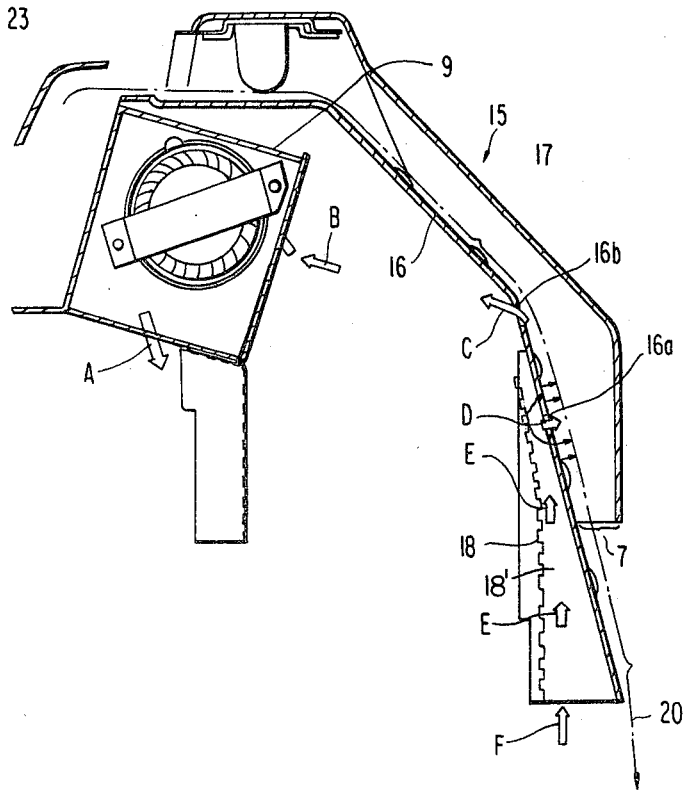
FIG. 6 is a side view of a paper ejector in the first embodiment shown in FIG. 1.

Referring to FIG. 6, the paper ejector 15 comprises a paper guide plate 16 having a plurality of through holes 16a and 16b, and a cover plate 17. A plate 18 is provided behind the perforated guide plate 16 to form an air duct 18'. A plurality of projections are provided on the plate 16 to prevent an adherence of the paper 20 to the plate 16. The cooling air flows from the duct 18' through the holes 16a, the space between the plate 16 and paper 20 and through the hole 16b to the cross flow fan 9 as depicted by arrows F, E, D, C and B form eddies. This makes it possible to separate the paper 20 from the guide plate 16, and to reduce the occurrence of static electricity on the paper 20 resulting in smooth feeding of the paper 20.

Figure 7:
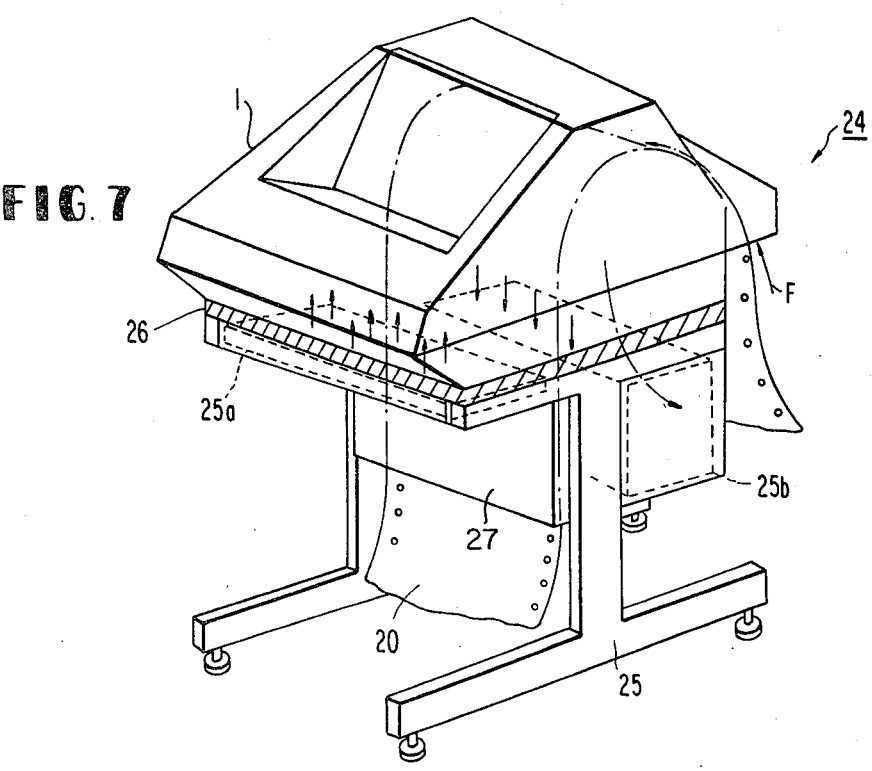
FIG. 7 is a perspective view of a second embodiment of this invention.
Figure 8:
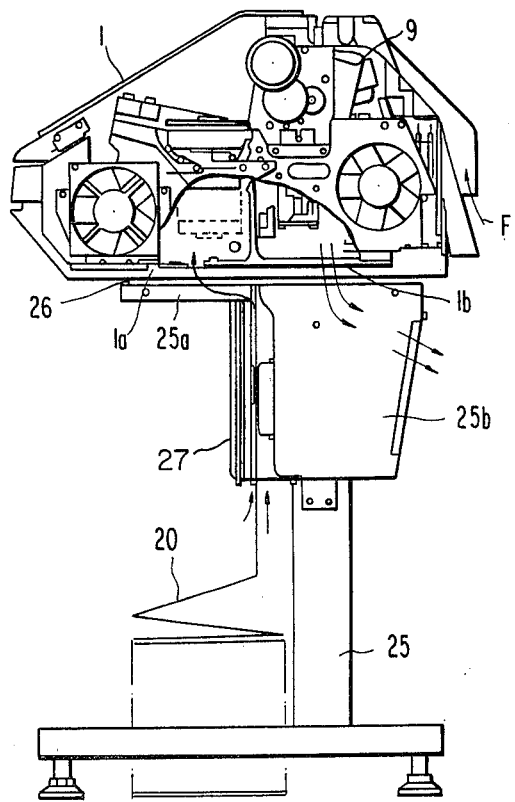
FIG. 8 is a side view of the second embodiment shown in FIG. 7.

Referring to FIGS. 7 and 8, the second embodiment 24 comprises the line printer 1, a printer table 25 supporting the printer 1, and a cushion 26 provided between the printer 1 and the table 25. The table 25 comprises muffler chambers 25a and 25b, and a paper guide 27 from which the paper 20 is fed to the printer 1 through the lower opening 1a. The cooling air is also fed through the guide 27 and the muffler chamber 25a to the printer 1. The heated air is passed through the lower opening 1b (FIG. 8) provided at the bottom of the printer 1 and the muffler chamber 25b and ventilated to outside. The muffler chambers 25a and 25b make it possible to produce a soundproof effect.

Figure 9:
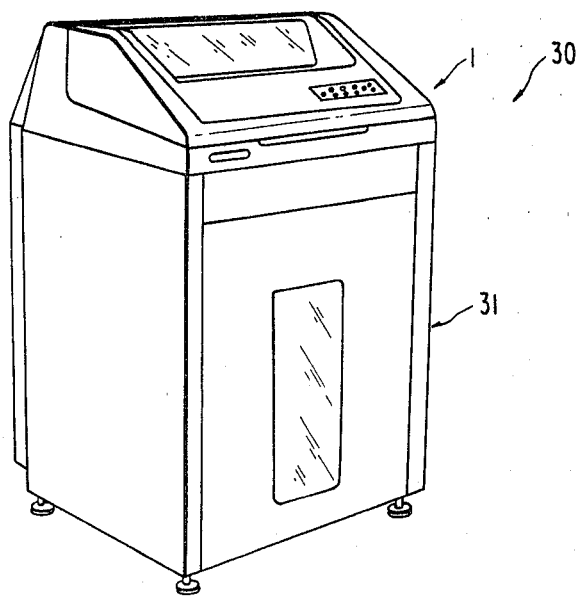
FIG. 9 is a perspective view of a third embodiment of this invention.
Figure 10:
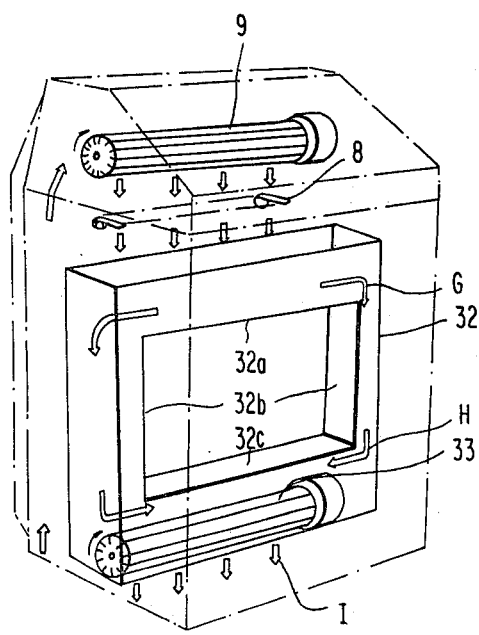
FIG. 10 is a perspective view for illustrating air-flow paths in the third embodiment shown in FIG. 9.

Referring to FIGS. 9 and 10, the third embodiment 30 comprises the line printer 1 and a sound arrester 31 on which the printer 1 is positioned. The sound arrester 31 comprises an air duct 32 and an additional cross flow fan 33 provided below the air duct 32 and identical to the fan 9. A sound absorber is provided on the inner surface of the air duct 32.

The air heated by the actuator assemblies 8 is passed through an upper horizontal path 32a to side vertical paths 32b in the air duct 32 as depicted by arrows G. The air passed through the side paths 32b is fed from a lower path 32C to the cross flow fan 33 as depicted by arrows H. The cross flow fan 33 ventilates the heated air from the lower opening of the sound arrester 31 as depicted by arrows I.

In the third embodiment, the air duct 32 constitutes a muffler and a rectangular vent. This produces the sound proof effect. Further, the sound absorber provided in the air duct 32 aids in reducing noises.

What is claimed is:

1. A line printer assembly comprising: a line printer, including:
   a plurality of type characters;
   a plurality of individually actuatable hammers, said type characters being impacted by said hammers;
   a hammer actuator arrangement including a plurality of hammer actuators for individually actuating said hammers; and
   a cross flow fan placed above said hammer actuator arrangement such that said cross flow fan longitudinally extends over an entire length of said hammer actuator arrangement, cooling air from said cross flow fan being directed to said hammer actuator arrangement from its upper side down to a bottom of said printer; and paper ejector means having a perforated paper guide plate provided at a rear of said printer; and an air inlet duct for said fan provided adjacent to said guide plate, air flowing into said inlet duct flowing into said fan via said perforations substantially vertical to said guide plate.

2. The line printer assembly as claimed in claim 1, wherein said line printer further comprises:
   a printer table for supporting said printer, said printer table including an air duct having an inlet at a printer mounting surface, and an outlet at the bottom of said printer table; and
   a cross flow fan arranged below said air duct, said cross flow fan forcing heated air from said printer to pass through said air duct and be ejected from said outlet.

3. A line printer assembly as claimed in claim 2, wherein said line printer assembly further comprises a sound arrester for supporting said printer.

4. A line printer as claimed in claim 3, wherein said sound arrester comprises an air duct having an inlet and an outlet, and a cross flow fan arranged below said outlet.

5. A line printer as claimed in claim 4, wherein said sound arrester further comprises a sound absorber provided on the inner surface of said air duct.

* * * * *

UNITED STATES PATENT AND TRADEMARK OFFICE
CERTIFICATE OF CORRECTION

PATENT NO. : 4,388,009
DATED : June 14, 1983
INVENTOR(S) : Kumagai et al

It is certified that error appears in the above-identified patent and that said Letters Patent is hereby corrected as shown below:

Column 2, line 58 - after "B" insert --to--.

Signed and Sealed this

Fifth Day of June 1984

[SEAL]

Attest:

GERALD J. MOSSINGHOFF

Attesting Officer     Commissioner of Patents and Trademarks